United States Patent [19]
Tasi et al.

[11] Patent Number: 6,063,645
[45] Date of Patent: May 16, 2000

[54] METHOD FOR INTEGRATED MASS FLOW CONTROLLER FABRICATION

[75] Inventors: Ming-Jye Tasi, Chunghua; Kuo-Ming Chang, Hsinchu; Chien-Hung Chen; Min-Chieh Chou, both of Taipei, all of Taiwan

[73] Assignee: Industrial Technology Research Instititute, Hsinchu, Taiwan

[21] Appl. No.: 09/097,359

[22] Filed: Jun. 15, 1998

[30] Foreign Application Priority Data

Dec. 11, 1997 [TW] Taiwan .................................. 86118649

[51] Int. Cl.[7] .................................................. H01L 21/308
[52] U.S. Cl. ................................. 438/50; 438/52; 438/455
[58] Field of Search ............................... 438/50, 52, 455, 438/928, FOR 412

[56] References Cited

U.S. PATENT DOCUMENTS

| | | |
|---|---|---|
| 4,808,009 | 2/1989 | Sittler et al. . |
| 5,201,221 | 4/1993 | Forgacs et al. . |
| 5,994,160 | 11/1999 | Niederman et al. . |

*Primary Examiner*—George Fourson
*Attorney, Agent, or Firm*—W. Wayne Liauh

[57] ABSTRACT

A manufacturing method of an integrated mass flow controller (MFC) module is disclosed. The integrated MFC module is comprising top, middle and bottom parts. The middle part of the integrated MFC module which is consist of both the microvalve and sensing regions that is the key feature of the present invention. The microvalve is formed by depositing a heating element in a microbridge suspended on a mesa to control the movement of the valve. On the other hand, a series of sensing elements of the sensing region are in the mass flow path to detect the mass flow. The top and bottom parts are used for mass flow channel, mass entrance, mass exit and signal output terminals. There are bumps in the interface between middle and bottom parts to support the microvalve mesa. All three parts are first fabricated on a semiconductor wafer separately and then engaged together to complete the integrated MFC module formation.

23 Claims, 15 Drawing Sheets

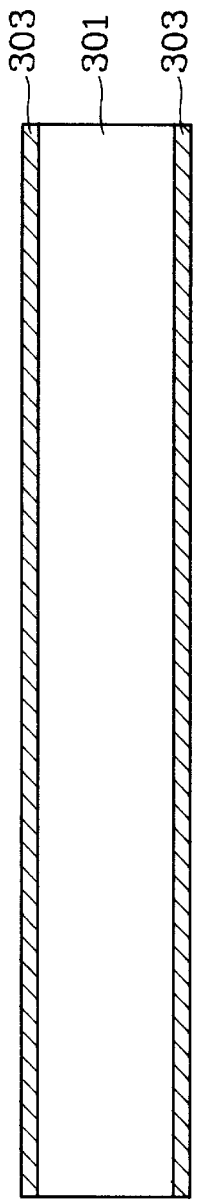
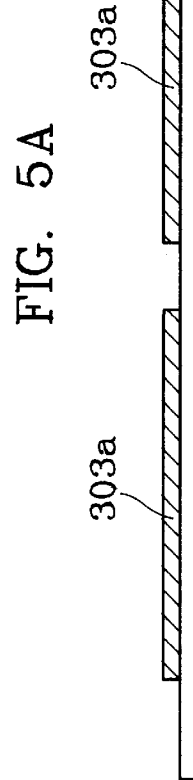
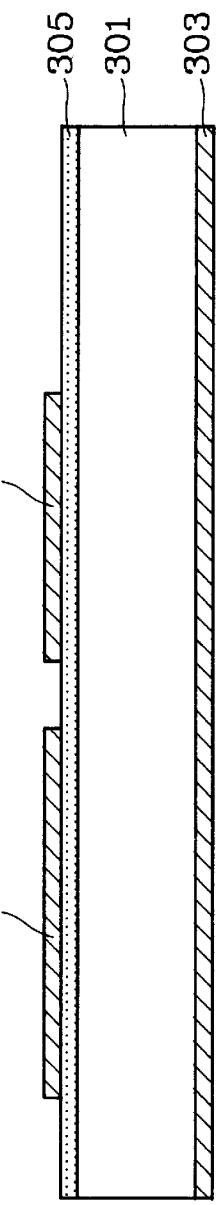
FIG. 5A
FIG. 5B
FIG. 5C

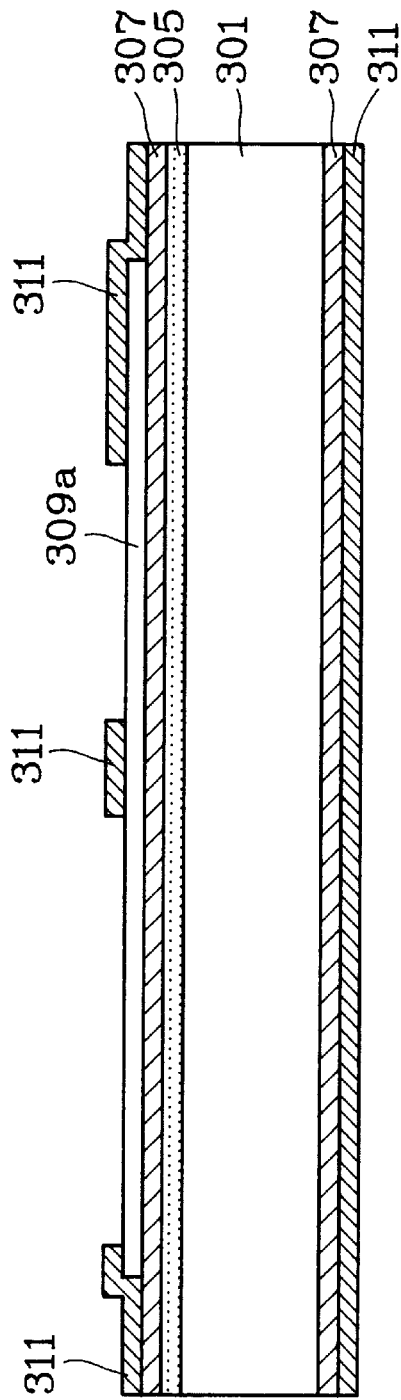
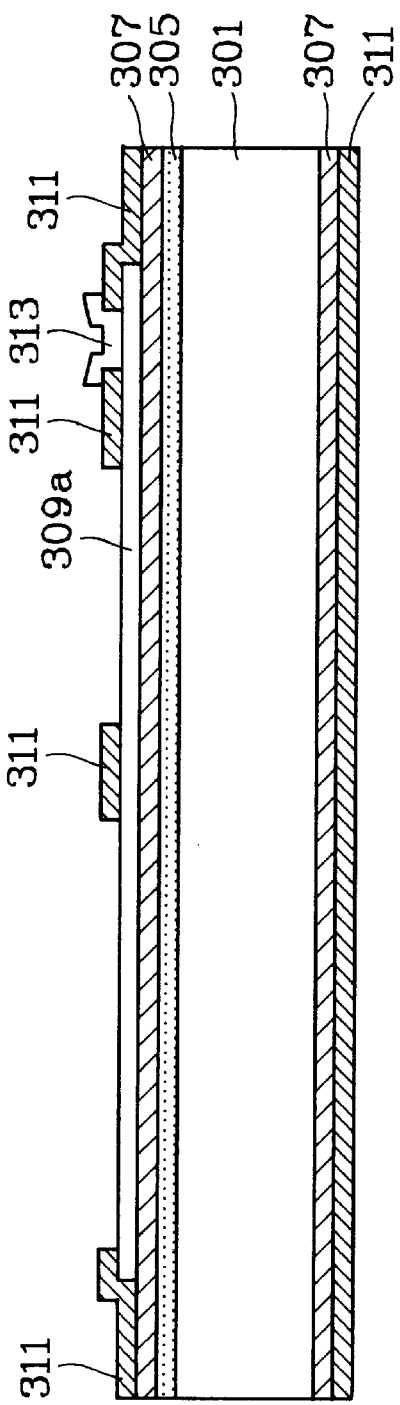

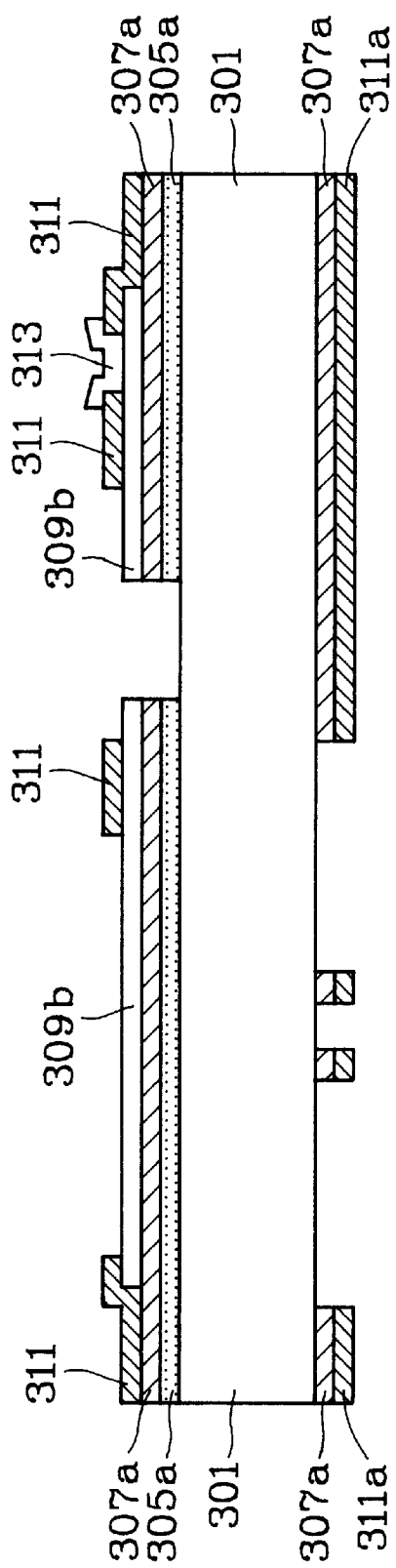
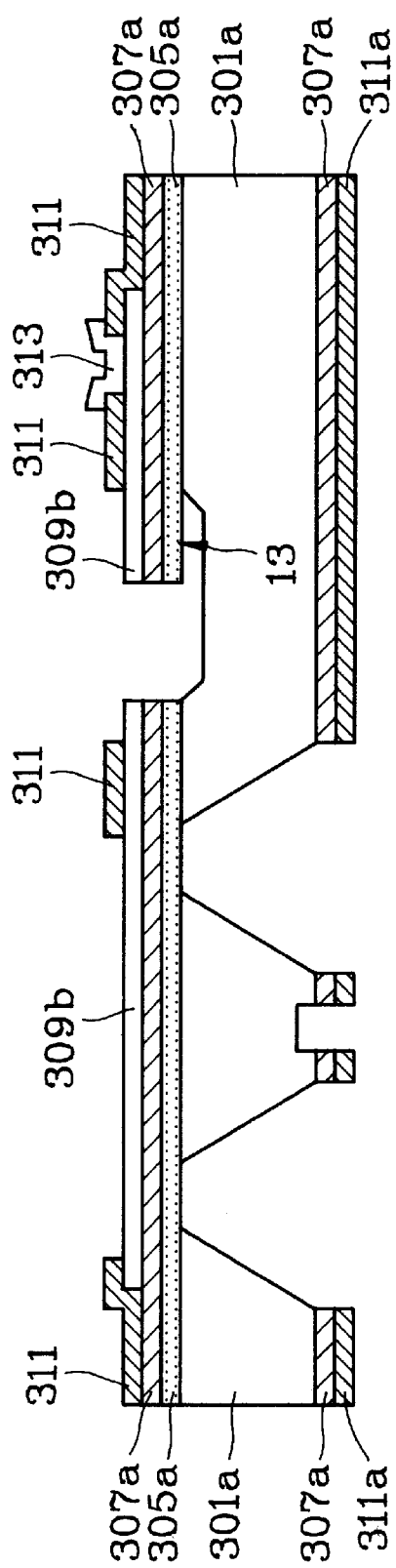
FIG. 5I
FIG. 5J

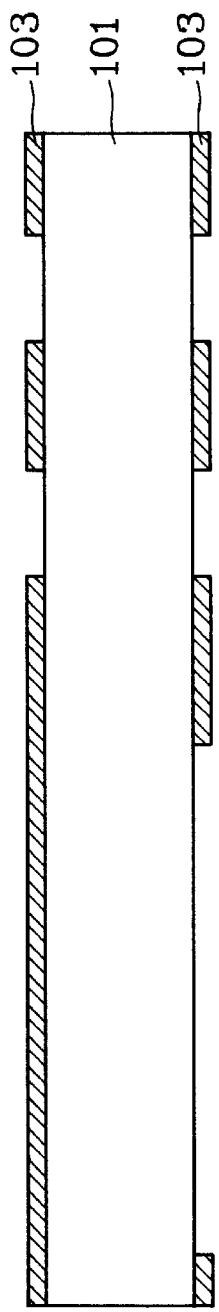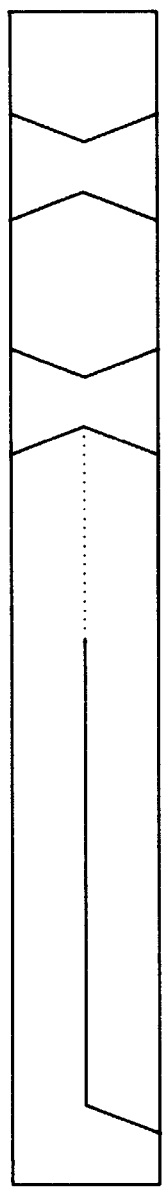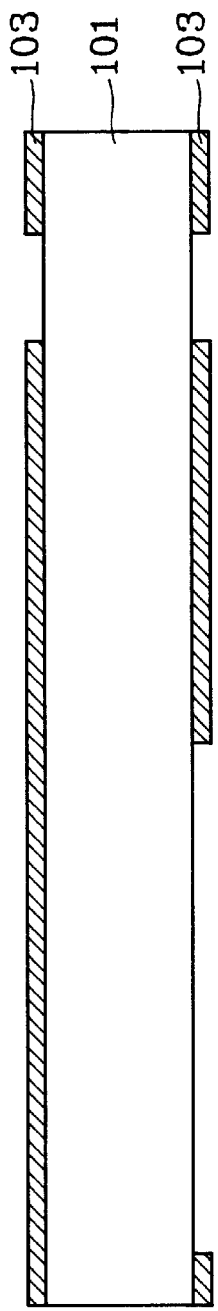

METHOD FOR INTEGRATED MASS FLOW CONTROLLER FABRICATION

BACKGROUND OF THE INVENTION

1. Field of the Invention

The invention relates to the fabrication methods of a mass flow controller (MFC), and more particularly, to the methods of manufacturing an integrated MFC module which has both microvalve and mass flow sensing regions on a single semiconductor substrate.

2. Description of the Prior Art

There are a number of sensing applications currently used to sense as well as precisely control the amount of tiny mass flow in a system that is typically in the order of ml/min for gas flow and in the order of µl/min for liquid flow. The linear dimensions of these devices which are in the order of cm offer the advantages of power saving, fast response and compact volume. In semiconductor fabricating processes, MFC plays an important role to precisely control the mass flow of gases or fluids in a system. Conventionally, the components of a MFC sensor are built individually and then installed together. For example, gas flow valves are usually employed electromagnetic or piezoresistive controlled valves. Flow sensors such as pressure difference, electromagnetic waves, ultrasonic or heat senescing types are often used. In the aspect for the design and manufacture of a MFC sensor, how to build those parts and incorporated on a substrate is the key technique for precision measurement. Therefore, this approach is unable to be practically mass-produced high quality MFC sensors.

Recent development trends of MFC device are integrated sensors, actuators, and controllers all in a single chip. For example, Both U.S. Pat. No. 4,808,009 to Sittler et al. and U.S. Pat. No. 5,201,221 to Forgacs et al. (the entire disclosures of which are herein incorporated by reference) disclosed integrated flow sensor structures built on a silicon substrate. However, they are somewhat different from the exact MFC structure and the fabricating process of the present invention disclosed herein.

The present invention discloses a novel integrated MFC sensor structure and the fabrication process which combines both microvalve and mass flow sensing regions on a single semiconductor substrate.

SUMMARY OF THE INNOVATION

Accordingly, it is a primary object of the present invention to provide an easy and manufacturable process of forming integrated MFC modules.

It is another object of the present invention to provide a method of fabricating integrated MFC modules which combine both microvalve and mass flow sensing regions on a single semiconductor substrate that minimizes assembly parts of the integrated MFC modules and increases the reliability.

It is yet another object of the present invention to provide a method of fabricating integrated MFC modules whose microvalve deformation is proportional to the external control voltage that increases the resolution and reliability of the microvalve.

It is a further object of the present invention to provide a method of fabricating integrated MFC modules whose mass sensing element is suspended on a microbridge structure that can accurately and quickly measure the mass flow of the system.

It is still a further object of the present invention to provide a method of fabricating integrated MFC modules that employs the technical features of silicon membrane and etching to offer the advantages of easy mass produced, low cost and compact volume.

It is a even further object of the present invention to provide a method of fabricating integrated MFC modules which constrain mass flow in a limited channel to minimize the flow turbulence caused by the environment.

In accordance with these objects of the present invention, a new method of manufacturing an integrated MFC module is achieved. The integrated MFC module is comprising top, middle and bottom parts. The middle part of the integrated MFC module which is consist of both the microvalve and sensing regions that is the key feature of the present invention. The microvalve is mainly formed by depositing a heating element suspended on a microbridge mesa, and a series of sensing elements are located right in the mass flow channel to detect the mass flow. The top and bottom parts provide mass flow channel, mass entrance, mass exit and signal output terminals. There are bumps in the interface between middle and bottom parts to support the microvalve mesa. All three parts are first fabricated on a semiconductor wafer separately and then engaged together to complete the integrated MFC module according to the present invention.

BRIEF DESCRIPTION OF THE DRAWINGS

In the accompanying drawings forming a material part of this description, there is shown:

FIGS. 2(D), 2(B) and 2(E) are top views of the top, middle and bottom parts of the integrated piezoresistive MFC module according to the alternative first embodiment of the present invention, respectively.

FIGS. 4(D), 4(B) and 4(E) are top views of the top, middle and bottom parts of the integrated thermoresistive MFC module according to the alternative second embodiment of the present invention, respectively.

FIGS. 5(A) to 5(J) are process cross sectional representations of the middle part of the integrated piezoresistive MFC module according to the first embodiment of the present invention.

FIGS. 7(A) and 7(B) are process cross sectional representations of the top part of the integrated MFC modules with the design of top mass entrance according to the preferred embodiments of the present invention.

FIG. 7(C) is a cross sectional representation of the top part of the integrated MFC modules with the design of bottom mass entrance according to the preferred embodiments of the present invention.

DESCRIPTION OF THE PREFERRED EMBODIMENTS

The invention disclosed herein is directed to a method of fabricating an integrated MFC module on a semiconductor substrate. In the following description, numerous details are set forth in order to provide a thorough understanding of the present invention. It will be appreciated by one skilled in the art that variations of these specific details are possible while still achieving the results of the present invention. In other instances, well known processing steps are not described in detail in order not unnecessarily to obscure the present invention.

FIRST EMBODIMENT OF THE INVENTION

Integrated Piezoresistive MFC Module

Figure 1A:
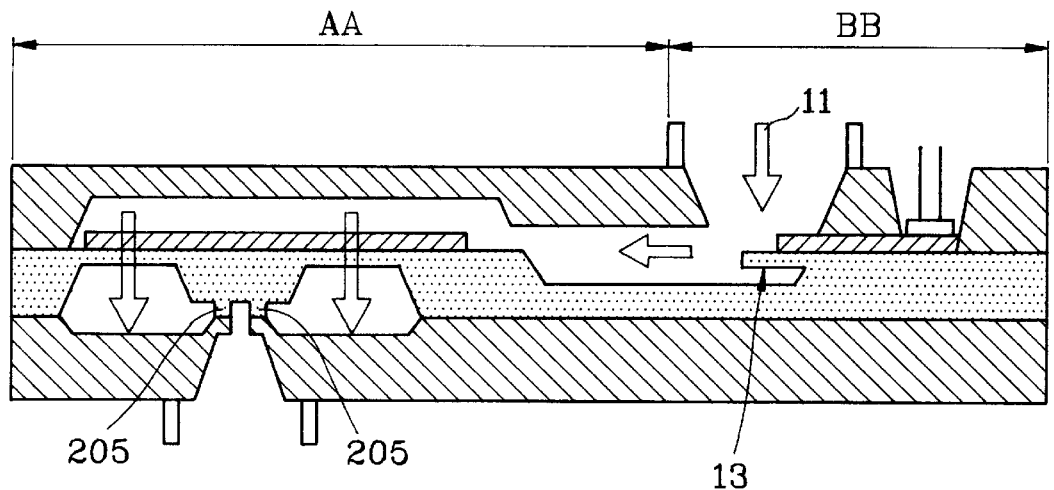
FIGS. 1(A) and 1(C) are cross sectional views of the integrated piezoresistive MFC module according to the first embodiment of the present invention when microvalve is closed and open, respectively.
Figure 1B:
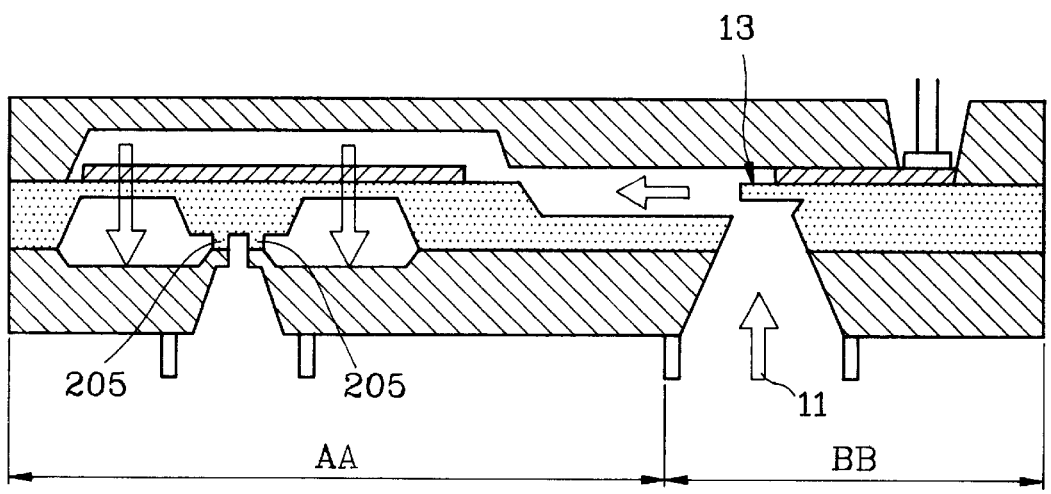
FIG. 1(B) is a cross sectional view of the integrated piezoresistive MFC module according to the alternatively first embodiment of the present invention when microvalve is closed.
Figure 1C:
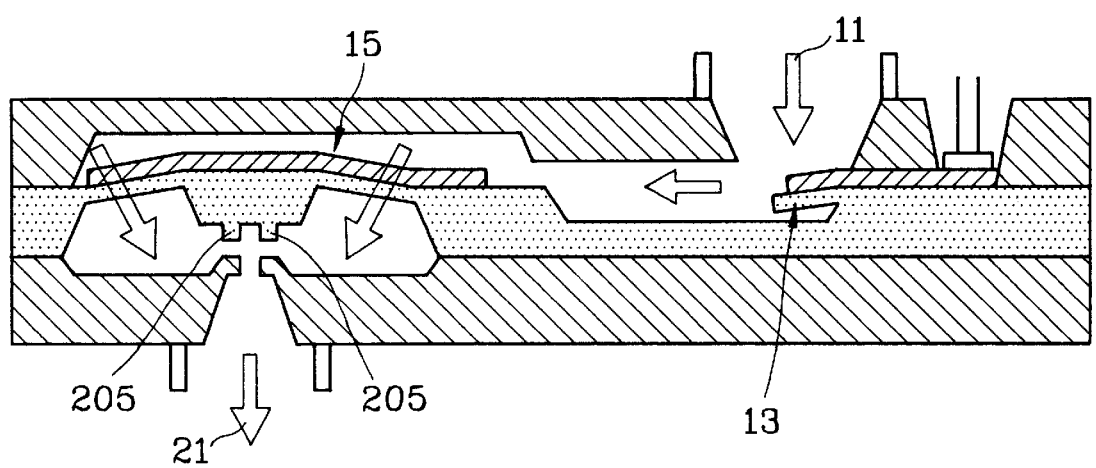

Referring now more particularly to FIG. 1, there are shown the cross sectional views of the integrated piezoresistive MFC modules which comprises of microvalve AA and mass flow sensing BB regions according to the present invention. The path of air (mass) flow in the integrated piezoresistive MFC module is first through an entrance 11 located on top surface, and then into a channel between microvalve AA and mass flow sensing BB regions as shown in FIG. 1a. The inner diameter of the channel is about 400 $\mu$m. Alternatively, air (mass) may directly flow from mass flow sensing region to microvalve region without the existence of the channel. Of course, the location of the entrance can be moved to the bottom surface of the substrate as shown in FIG. 1b. The sensing element of the MFC modules which is composed of piezoresistive materials such as polysilicon is built on a suspended structure to reduce heat conduction loss to the substrate. The operational principle of the piezoresistive MFC is that the resistance change of the piezoresistive materials generates a potential difference caused by the distortion of the suspended structure when there is mass flowing in the MFC system. Then, the mass is going to next stage—microvalve region AA which is mainly consist of a microbridge built on a mesa. A heater 15 which is composed of polysilicon or bimetal is deposited on the microbridge structure to control the movement of the microvalve depending on the heat deformation caused by electrical signals. In order to obtain maximum linear deformation, bumps are formed in the mass exit of the MFC module. Based upon the extrinsic control input voltage, the microvalve is opened to create a steady mass flow towards the exit 21, and therefore the mass flow can be detected by the piezoresistive sensing element as shown in FIG. 1c.

Referring now to FIG. 2, there are shown the top views of the integrated piezoresistive MFC modules which corresponds to the cross sectional views of FIG. 1 according to the present invention. The integrated piezoresistive MFC module of the present invention is a sandwich structure which is mainly consist of top, middle and bottom three parts. Referring now to FIG. 2a, there is shown the top part 1 of the integrated piezoresistive MFC module which is a substrate composed of glass, semiconductor wafer, or plastic is served for mass flow channel and the cavity of microvalve. Referring now to FIG. 2b, there is shown the middle part 3 of the integrated piezoresistive MFC module which is consist of both the microvalve and sensing regions that is the key feature of the present invention. The microvalve is formed by depositing a heating element in a microbridge 33 suspended on a mesa, and the sensing microbridge structure 31 is located right under the mass entrance to detect the mass flow. In addition, there are bumps 205 in the interface between middle and bottom parts to support the microvalve mesa. Referring now to FIG. 2c, there is shown the bottom part 3 of the integrated piezoresistive MFC module which is mainly served as the mass exit 21. After all three parts are formed, they are engaged together to complete the integrated piezoresistive MFC module of the present invention.

Figure 2A:
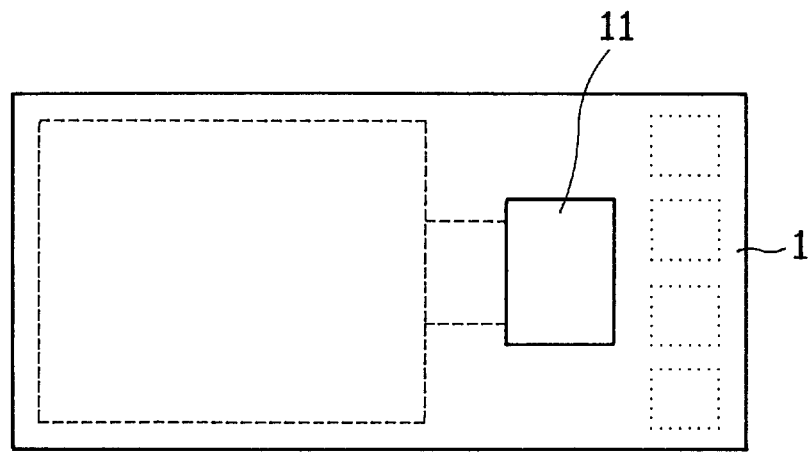
FIGS. 2(A), 2(B) and 2(C) are top views of the top, middle and bottom parts of the integrated piezoresistive MFC module according to the first embodiment of the present invention, respectively.
Figure 2B:
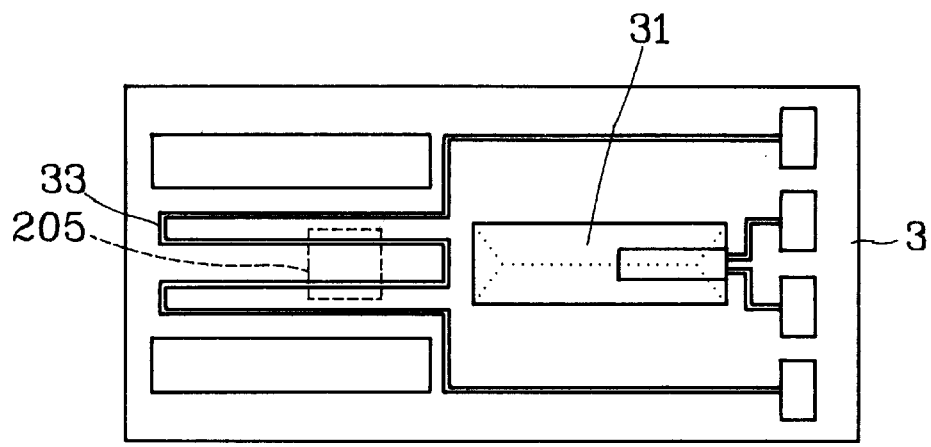
Figure 2C:
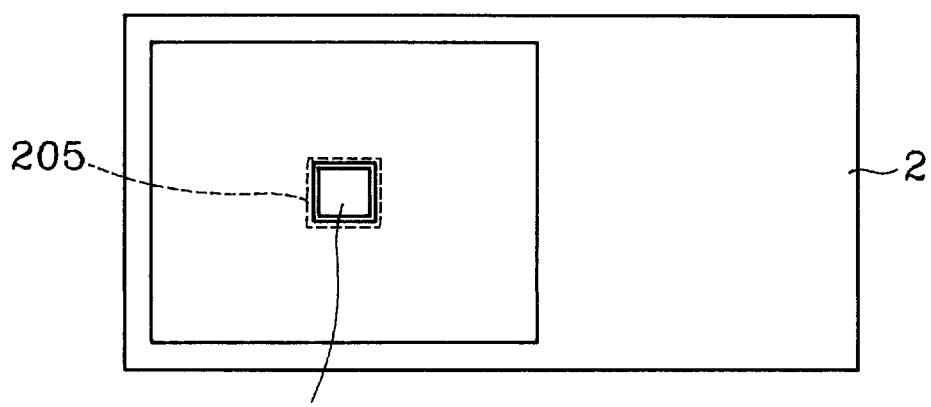
Figure 2D:
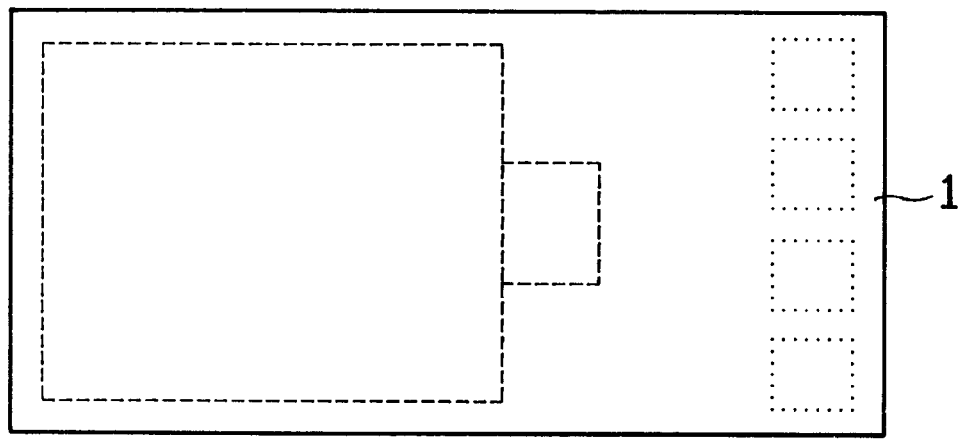
Figure 2E:
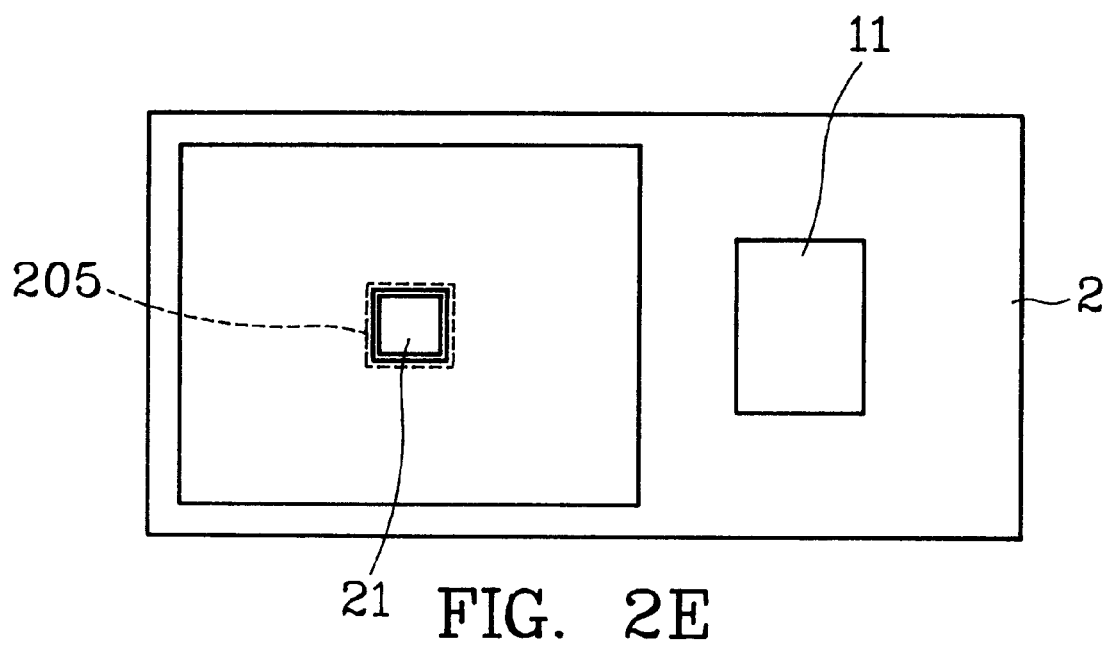

Alternatively, the position of the mass entrance can be moved to the bottom part that slightly changes the designs of the top and bottom parts as shown in FIGS. 2d and 2e, respectively.

The process flow of this integrated piezoresistive MFC modules is described as follows, the selection of the heating element is preferable to be the same material of either piezoresistive or thermoresistive sensing elements, referring now to FIGS. 5, there are shown the process cross sectional views of the middle part:

(a) The starting material is a semiconductor substrate 301 such as silicon or gallium aresnide (GaAs). An oxide layer 303 is grown on the surfaces of the substrate to a thickness of about 1.5 $\mu$m as shown in FIG. 5a.

(b) The oxide layer on the front side of semiconductor substrate that is served as a diffusion barrier 303a for next step is patterned by the conventional lithography and etching techniques to define the microvalve and mass flow sensing regions as shown in FIG. 5b, (c) A diffusion layer 305 is formed on the front side surface of semiconductor substrate as shown in FIG. 5c. The diffusion layer which is served for microvalve of the microvalve region and microbridge of the mass flow sensing region is usually formed by diffusing impurities such as boron into semiconductor substrate at a high temperature. Alternatively, other techniques may be used to form the diffusion layer. The junction depth of the diffusion layer is about 10 $\mu$m.

Figure 5D:
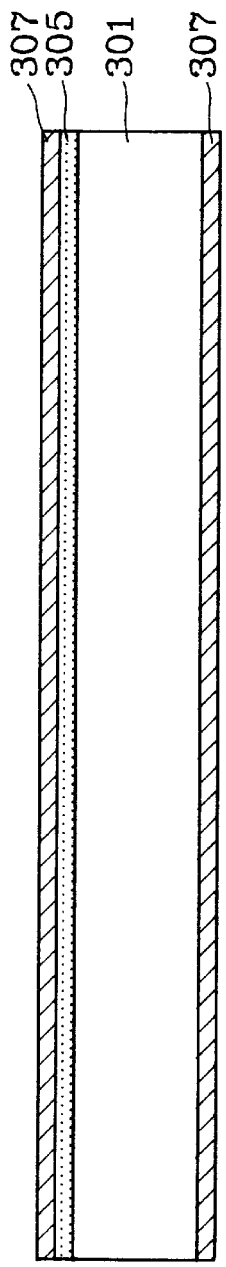

(d) After the remaining of the oxide layer 303a is removed, a dielectric layer 307 is deposited on the surface of both front and back sides of the semiconductor substrate for isolation as shown in FIG. 5d. The dielectric layer is silicon dioxide grown by wet oxidation, other dielectric materials such as silicon nitride or polyimide may also work.

Figure 5E:
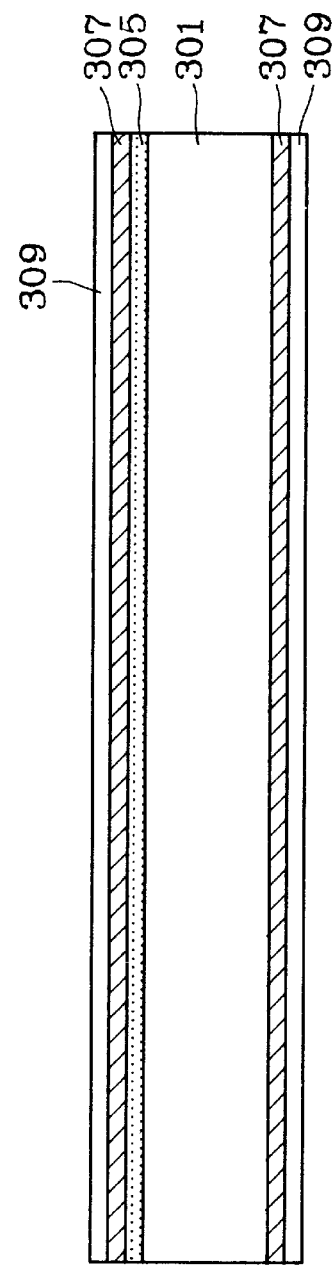

(e) A layer of piezoresistive material 309 is formed overlaying the dielectric layer on both front and back sides of the semiconductor substrate as shown in FIG. 5e. The piezoresistive layer which is usually composed of polysilicon is served for heater of the microvalve region and sensing element of the mass flow sensing region. The polysilicon layer is usually formed by chemical vapor deposition (CVD) to a thickness of 0.2 to 0.4 μm, preferably to a thickness about 0.3 μm. Since single crystal structure is essential for better piezoresistive performance, post anneal treatment may be performed to obtain single crystal polysilicon. Impurities such as phosphorus may be doped into the polysilicon layer to further reduce the resistivity of the polysilicon layer.

Figure 5F:
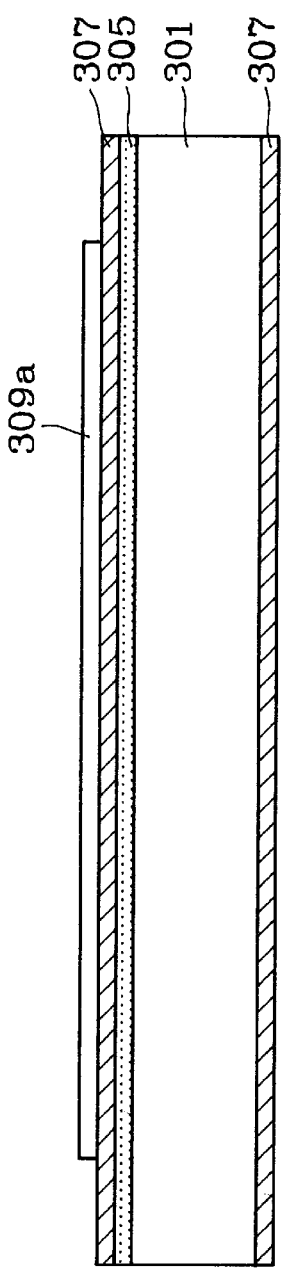

(f) Referring now to FIG. 5f, the piezoresistive layer 309a is partially etched to define heater area 15 of the microvalve region and the microbridge 13 of the mass flow sensing region as previous described in FIG. 1.

(g) A passivation layer 311 is deposited over the entire semiconductor substrate, and then the passivation layer is patterned to define mass flow channel of the microvalve region and sensing membrane of the mass flow sensing region as shown in FIG. 5g. The passivation layer is usually silicon nitride or oxynitride formed by CVD to a thickness about 0.3 μm. The passivation layer patterning is using reactive ion etching (RIE) technique, alternatively, other types of plasma etching, ion milling or wet etching methods may also work.

(h) A metal layer 313 is formed and then patterned overlaying the passivation and the piezoresistive layers on the front side of the semiconductor substrate to carry out signals as shown in FIG. 5h. The metal layer is usually Pt/Cr alloy, alternatively, low resistivity metals such as aluminum (Al), silver (Ag) or gold (Au) can be used. Metal patterning process is usually employed lift-off technique for convenience, alternatively, conventional lithography and etching techniques can also work.

(i) The passivation, dielectric and diffusion layers are partially etched to define microbridge structure on a mesa as well as open process windows for subsequent substrate etching step as shown in FIG. 5i.

(j) Finally, the semiconductor substrate is etched to define suspended heater structure of the microvalve region, suspended sensing structure of the mass flow sensing region, and at least one supporting bumps as shown in FIG. 5j. The middle part of the integrated MFC module that is the key feature of the present invention is completed. The substrate etching process can be isotropic or anisotropical etching. The most preferred etching conditions of this embodiment is immersing the substrate into potassium hydroxide (KOH) solution at a temperature range of about 50° C. to 70° C. Alternatively, ethylenediamine pyrocatechol (EDP) or tetra-methyl amino-hydroxide (TMAH) solutions can also be used.

Referring now to FIG. 7, there are shown the process cross sectional views of the top part which is correspond to FIG. 1a:

(a) The starting material is a substrate 101 such as silicon wafer or flat glass penal. An etching mask layer 103 is formed by the conventional lithography and double side alignment techniques to define mass entrance, signal output terminals and the cavity to accommodate the middle part of the MFC module of the present invention. The etching mask layer 103 is usually Au/Cr alloy, and patterned by an typical process well known in the art such as lift-off method.

(b) The substrate 101 which is not protected by the etching mask pattern 103 is etched to formed top part structure of the MFC module, thereafter, the etching mask pattern is removed as shown in FIG. 7b. The substrate etching is usually using hydrofluoride acid (HF). The etching mask which is composed of gold is removed by laqua regia.

Similarly, the top part of the MFC module which is correspond to FIG. 1b can be made by the same process steps. The only difference is that the mass entrance is moved to bottom part. Therefore, the etching mask pattern is modified as shown in FIG. 7c.

Figure 8A:
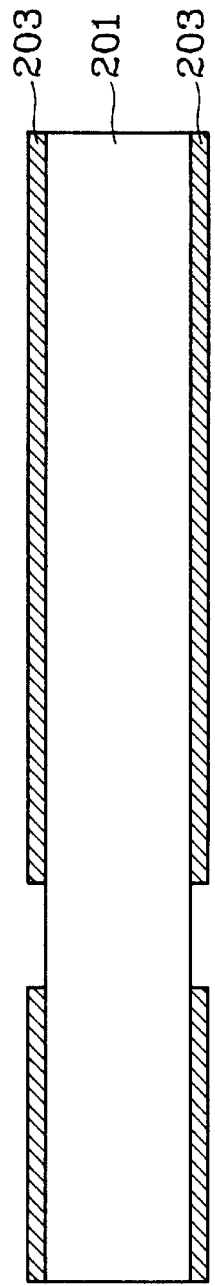
FIGS. 8(A) and 8(B) are process cross sectional representations of the bottom part of the integrated MFC modules with the design of top mass entrance according to the preferred embodiments of the present invention.

Referring now to FIG. 8, there are shown the process cross sectional views of the bottom part which is correspond to FIG. 1a:

(a) The starting material is a substrate 201 such as silicon wafer or glass flat penal. An etching mask layer 203 is formed by the conventional lithography and double side alignment techniques to define mass exist, signal output terminals and the cavity to accommodate the middle part of the MFC module of the present invention as shown in FIG. 8a. The etching mask layer 203 is also Au/Cr alloy as previously described.

Figure 8B:
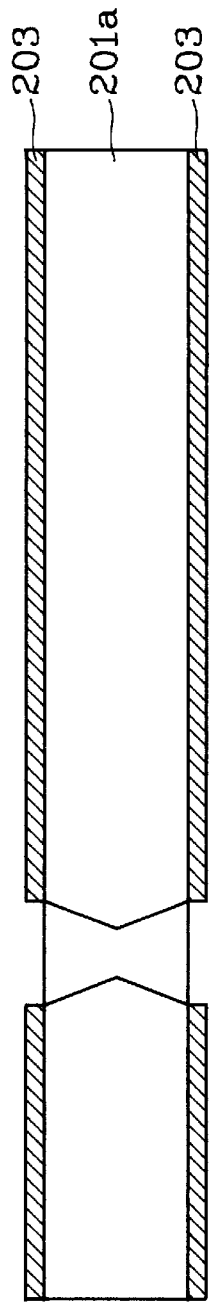

(b) The substrate 201 which is not protected by the etching mask pattern 203 is etched to formed bottom part structure of the MFC module, thereafter, the etching mask pattern is removed as shown in FIG. 8b.

Figure 8C:
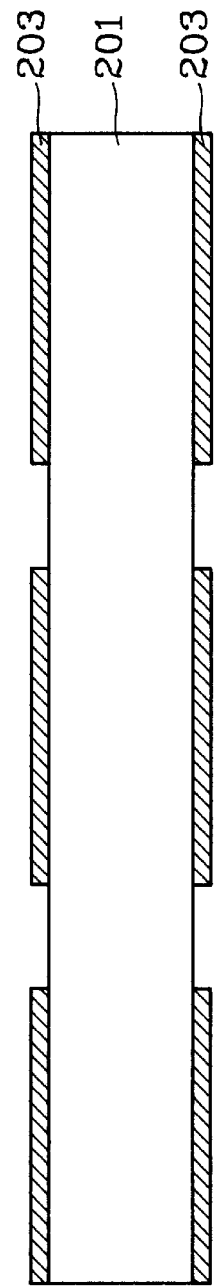
FIG. 8(C) is a cross sectional representation of the bottom part of the integrated MFC modules with the design of bottom mass entrance according to the preferred embodiments of the present invention.

Similarly, the bottom part of the MFC module which is correspond to FIG. 1b can be made by the same process steps. The only difference is that the mass entrance is also in the bottom part that is incorporated with FIG. 7c. Therefore, the etching mask pattern is also modified as shown in FIG. 8c.

Finally, the three parts (top, middle and bottom) of the MFC module are engaged together by the conventional process well known in the art such as anode engagement. The integrated MFC module of the present invention that are shown in FIG. 1a or FIG. 1b is accomplished.

SECOND EMBODIMENT OF THE INVENTION

Integrated Thermoresistive MFC Module

Figure 6A:
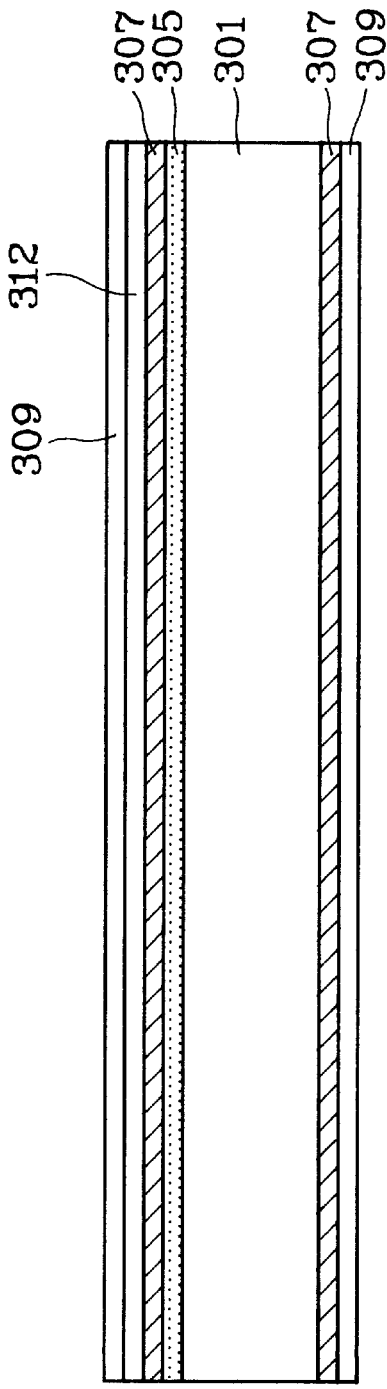
FIGS. 6(A) and 6(B) are process cross sectional representations of the middle part of the integrated thermoresistive MFC module according to the second embodiment of the present invention.
Figure 6B:
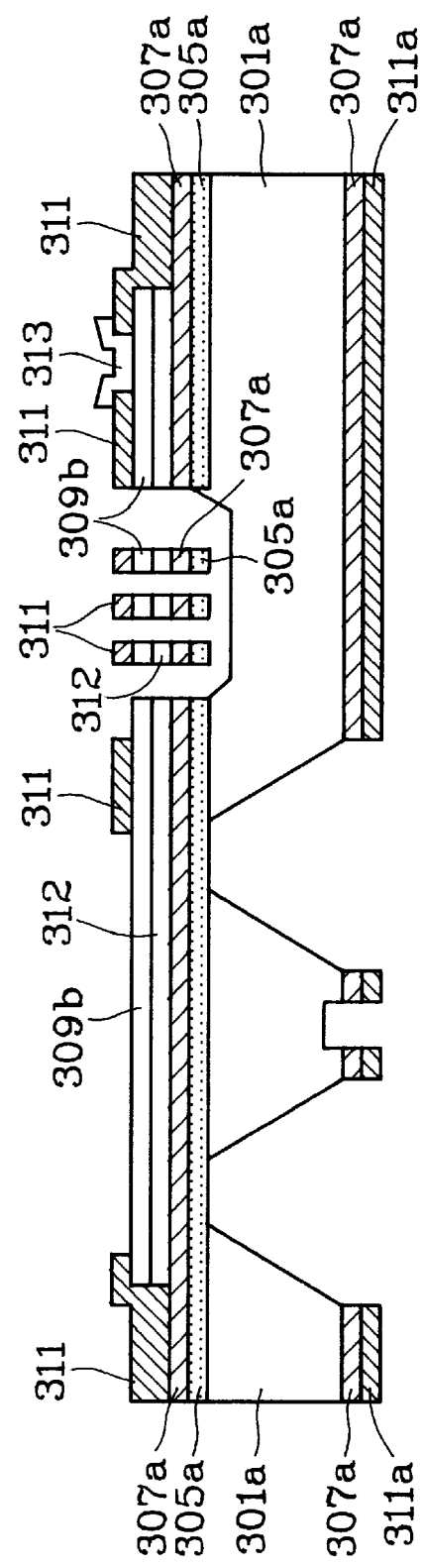

Alternatively, FIGS. 3, 4, and 6 illustrate another preferred embodiment of the present invention. The same reference numbers represent the same elements of the first embodiment.

Figure 3A:
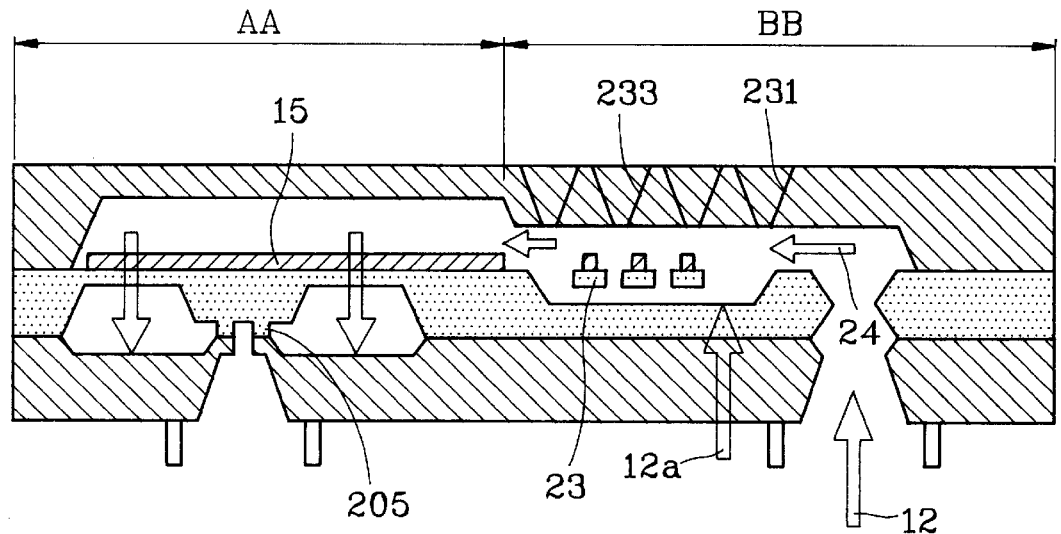
FIGS. 3(A) and 3(C) are cross sectional views of the integrated thermoresistive MFC module according to the second embodiment of the present invention when microvalve is closed and open, respectively.
Figure 3B:
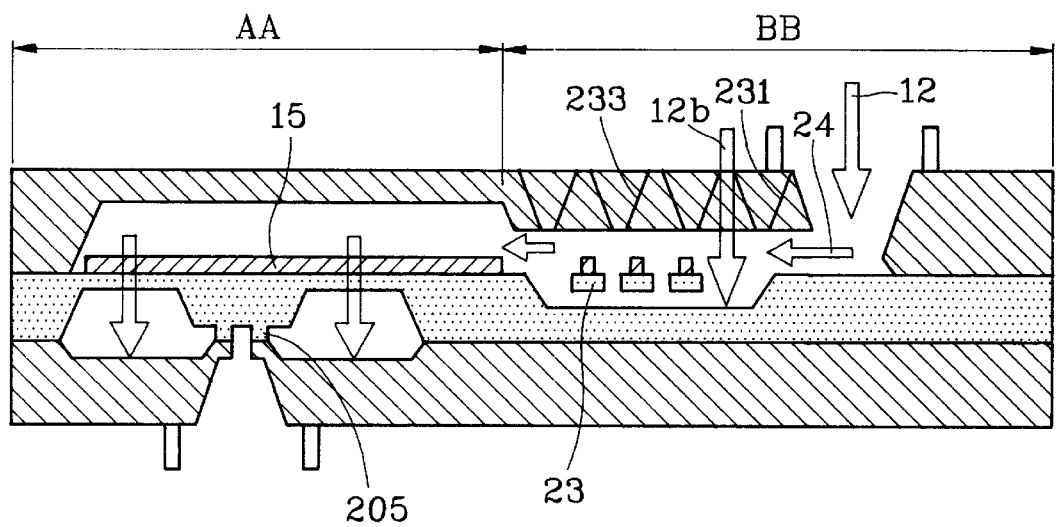
FIG. 3(B) is a cross sectional view of the integrated thermoresistive MFC module according to the alternatively second embodiment of the present invention when microvalve is closed.

Referring now more particularly to FIG. 3, there are shown the cross sectional views of the integrated thermoresistive MFC modules which comprises of microvalve AA and mass flow sensing BB regions according to the present invention. The path of air (mass) flow in the integrated thermoresistive MFC module is first through an entrance 12 located on bottom surface, and then into a channel 24 between microvalve AA and mass flow sensing BB regions as shown in FIG. 3a. The inner diameter of the channel is about 400 μm. Alternatively, air (mass) may directly go into mass flow sensing region from entrance 12a without the exist of channel, other parts of the integrated thermoresistive MFC module such as channel 24, thermoresistive sensing elements 23, microbridge mesa 15 of microvalve AA and exit are at the same place as previously described. Of course, the location of the entrance can be moved to the top surface of the substrate as shown in FIG. 3b. The sensing elements of the MFC modules which is composed of thermoresistive materials 23 are built on a suspended structure to reduce heat conduction loss to the substrate.

Figure 3C:
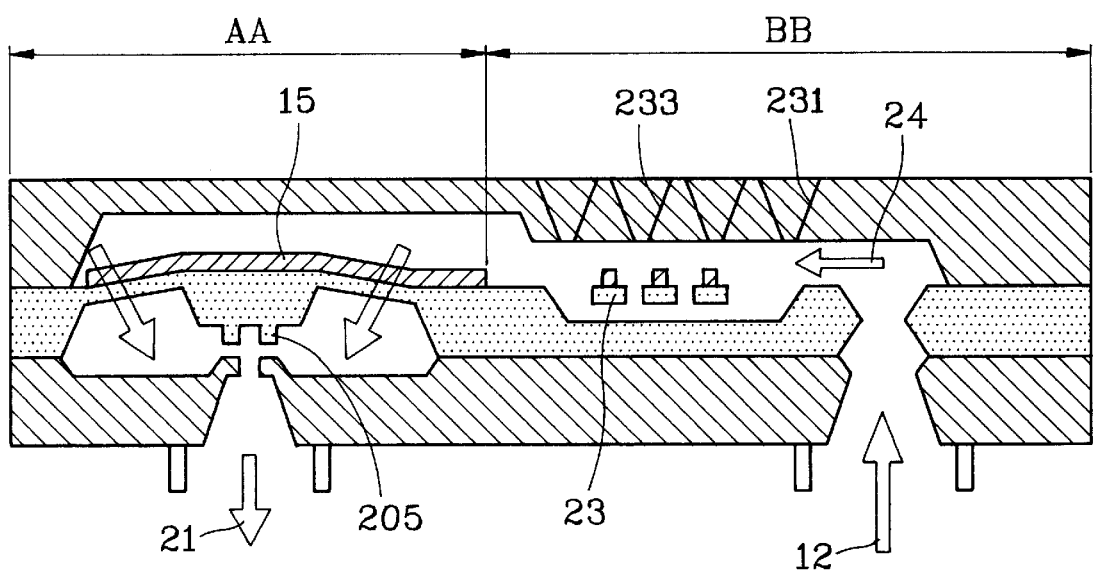

The operational principle of the thermoresistive MFC is that temperature differences of the thermoresistive sensing elements along the upper 231 and lower 233 reaches of mass flow path generate a signal based upon the resistance change of the thermoresistive materials when mass is flowing in the MFC system. Then, the mass is going to next stage—microvalve region AA which is mainly consist of a microbridge built on a mesa. The thickness of the microbridge is in the order of 10 µm. A heater 15 which is composed of polysilicon or bimetal is deposited on the microbridge structure to control the movement of the microvalve depending on the heat deformation caused by external electrical signals. In order to obtain maximum linear deformation, bumps are formed in the mass exit of the MFC module. Based upon the extrinsic control input voltage, the microvalve is opened to create a steady mass flow towards the exit 21, and therefore the mass flow can be detected by the thermoresistive sensing element as shown in FIG. 3c. FIG. 3 illustrate the integrated thermoresistive MFC module which carries four pairs of input and output signals for upper reach temperature sensing, sensor heater control, lower reach temperature sensing and microvalve heater control, respectively.

Referring now to FIG. 4, there are shown the top views of the integrated thermoresistive MFC modules which corresponds to the cross sectional views of FIG. 3 according to the present invention. The integrated thermoresistive MFC module of the present invention is a sandwich structure which is mainly consist of top, middle and bottom three parts. Referring now to FIG. 4a, there is shown the top part 1 of the integrated thermoresistive MFC module which is a substrate composed of glass, semiconductor wafer, or plastic is served for mass flow channel and the cavity of microvalve. Referring now to FIG. 4b, there is shown the middle part 3 of the integrated thermoresistive MFC module which is consist of both the microvalve and sensing regions that is the key feature of the present invention. The microvalve is mainly formed by depositing a heating element in a microbridge 33 suspended on a mesa, and a series of sensing elements 23 along the mass flow channel to detect the mass flow. In addition, there are bumps 205 in the interface between middle and bottom parts to support the microvalve mesa. Referring now to FIG. 4c, there is shown the bottom part 3 of the integrated thermoresistive MFC module which is mainly served as the mass entrance 12 and exit 21. After all three parts are formed, they are engaged together to complete the integrated thermoresistive MFC module of the present invention. The design of this integrated thermoresistive MFC module is very similar to that of piezoresistive MFC module previously described in first preferred embodiment except for the operational principle of the mass flow sensing elements.

Figure 4A:
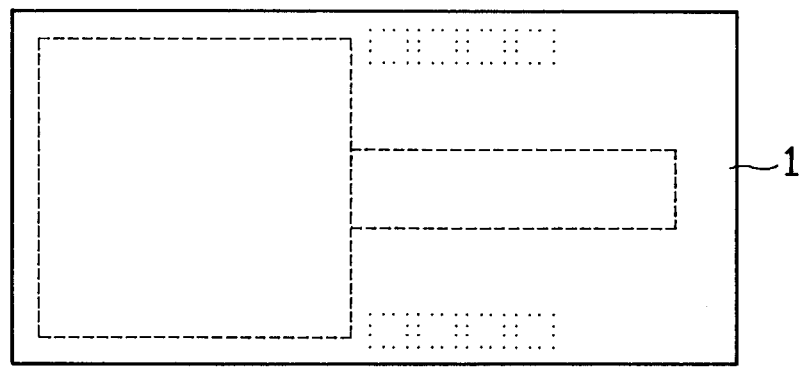
FIGS. 4(A), 4(B) and 4(C) are top views of the top, middle and bottom parts of the integrated thermoresistive MFC module according to the second embodiment of the present invention, respectively.
Figure 4B:
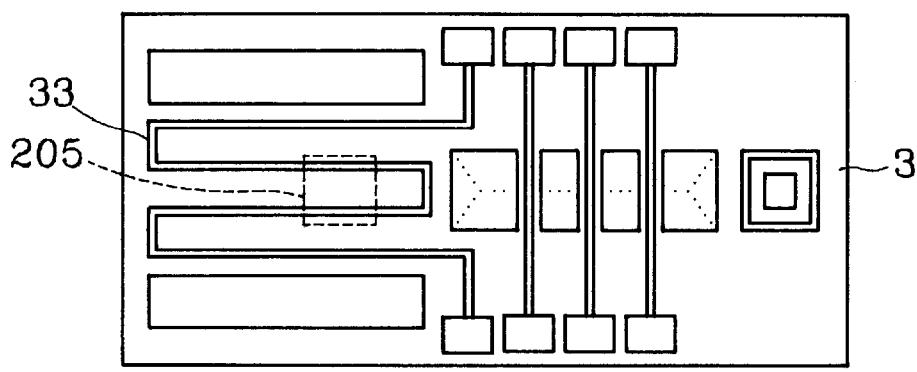
Figure 4C:
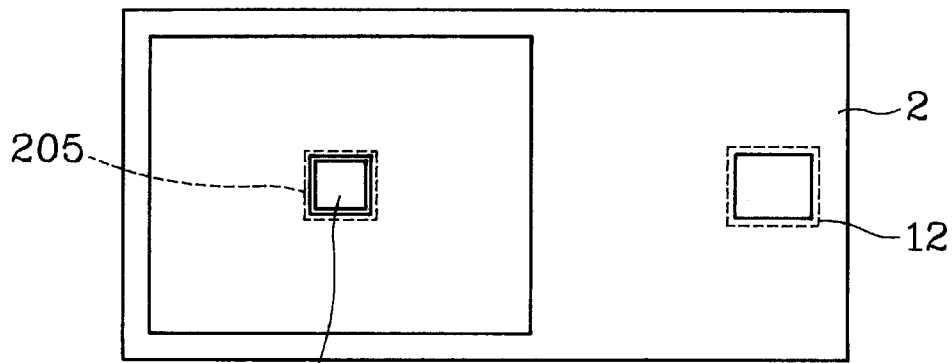
Figure 4D:
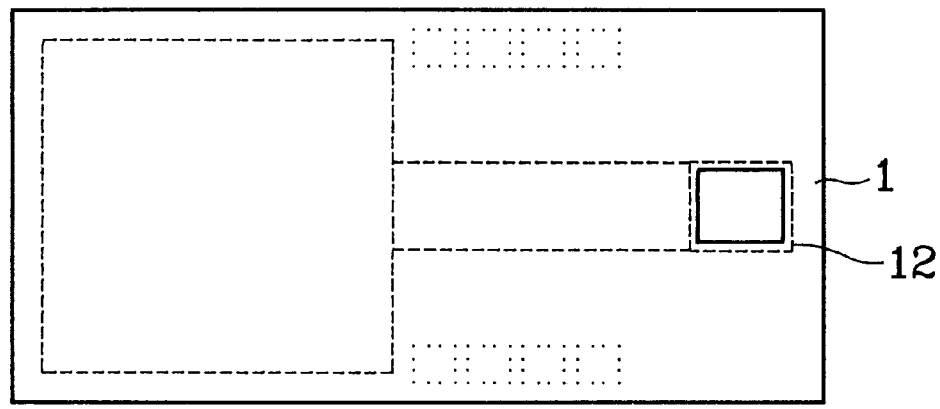
Figure 4E:
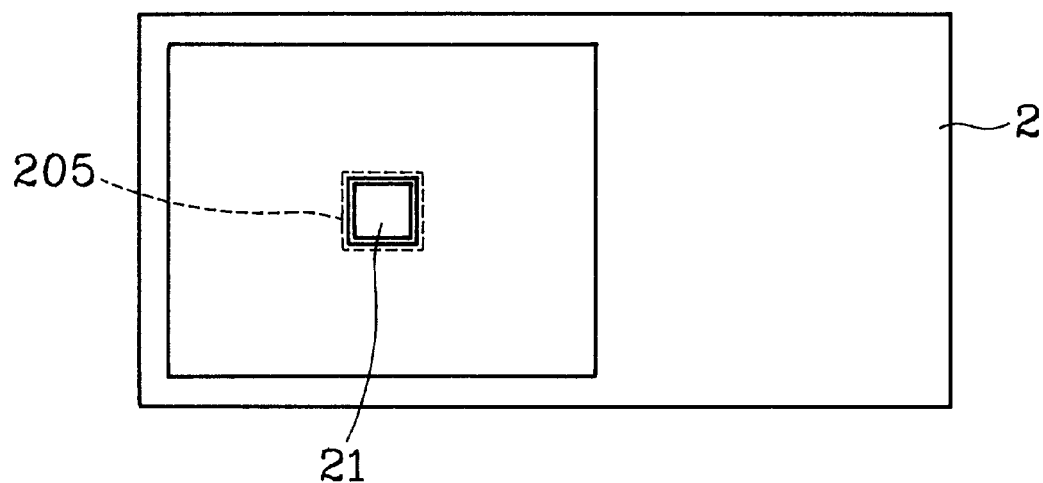

Alternatively, the position of the mass entrance can be moved to the top part that changes the layouts of the top and bottom parts slightly as shown in FIGS. 4d and 4e, respectively.

The process flow of this integrated thermoresistive MFC modules is described as follows that is following the same steps prior to step (e), referring now to FIGS. 5 and 6, there are shown the cross sectional views of the middle part:

(a) An oxide layer 303 is grown on the surfaces of a semiconductor substrate to a thickness of about 1.5 µm as shown in FIG. 5a.

(b) The oxide layer on the front side of semiconductor substrate that is served as a diffusion barrier 303a for next step is patterned by the conventional lithography and etching techniques to define the microvalve and mass flow sensing regions as shown in FIG. 5b.

(c) A diffusion layer 305 is formed on the front side surface of semiconductor substrate as shown in FIG. 5c. The diffusion layer is served for microvalve of the microvalve region and microbridge of the mass flow sensing region.

(d) After the remaining of the oxide layer 303a is removed, a dielectric layer 307 is deposited on the surface of both front and back sides of the semiconductor substrate for isolation as shown in FIG. 5d.

(e) A barrier layer 312 and a thermoresistive layer 309 are sequentially formed overlaying the dielectric layer on both front and back sides of the semiconductor substrate as shown in FIG. 6a. The barrier layer is usually composed of titanium (Ti) or chrome (Cr) to improve the interface adhesion between dielectric layer 307 and thermoresistive layer 309. The thermoresistive layer which is usually high temperature coefficient materials such as polycilicon or platinum (Pt) is served for heater of the microvalve region and sensing element of the mass flow sensing region. The thickness of thermoresistive layer 309 is in the range of 0.2 to 0.4 µm, preferably about 0.3 µm.

(f) The thermoresistive layer 309 and barrier layer 312 are partially etched to define heater area 15 of the microvalve region and said microbridge 13 of the mass flow sensing region as previous described in FIG. 1.

(g) A passivation layer 311 is deposited over the entire semiconductor substrate, and then the passivation layer is patterned to define mass flow channel of the microvalve region and sensing membrane of the mass flow sensing region.

(h) A metal layer 313 is formed and then patterned overlaying the passivation and the thermoresistive layers on the front side of the semiconductor substrate to carry out signals.

(i) The passivation, dielectric and diffuision layers are partially etched to define microbridge structure on a mesa and open process windows for subsequent substrate etching step.

(j) Finally, the semiconductor substrate is etched to define suspended heater structure of the microvalve region, suspended sensing structure of the mass flow sensing region, and at least one supporting bumps as shown in FIG. 5j. The middle part of the integrated thermoresistive MFC module that is the key feature of the present invention is completed.

Similarly, the top and bottom parts of the thermoresistive MFC module can also be made by the same process steps as shown in FIGS. 7 and 8 that only need minor modifications based upon the actual layouts of these parts.

Finally, the three parts (top, middle and bottom) of the MFC module are engaged together by the conventional process well known in the art such as anode engagement. The integrated MFC module of the present invention that are shown in FIG. 3a or FIG. 3b is accomplished.

While the present invention has been particularly shown and described with reference to the preferred embodiments thereof, it will be understood by those skilled in the art that various changes in form and details may be made without departing the spirit and scope of the present invention.

What is claimed is:

1. A method of fabricating an integrated MFC module on a semiconductor substrate with front and back sides, wherein said MFC module comprises microvalve and mass flow sensing regions, comprising the steps of:

(a) growing an oxide layer on the surface of both front and back sides of said semiconductor substrate;

(b) partially etching said oxide layer on the front side of semiconductor substrate to define said microvalve and mass flow sensing regions;

(c) forming a diffusion layer on the front side surface of semiconductor substrate, wherein said diffusion layer is served for microvalve of said microvalve region and microbridge of said mass flow sensing region;

(d) removing the remaining of said oxide layer, and then forming a dielectric layer on the surface of both front and back sides of said semiconductor substrate;

(e) forming a layer of piezoresistive material overlaying said dielectric layer on both front and back sides of said semiconductor substrate, wherein said piezoresistive layer is served for heater of said microvalve region and sensing element of said mass flow sensing region;

(f) partially etching said piezoresistive layer to define heater area of said microvalve region and said microbridge of said mass flow sensing region;

(g) depositing a passivation layer over the entire said semiconductor substrate, and then pattering said passivation layer to define mass flow channel of said microvalve region and sensing membrane of said mass flow sensing region;

(h) depositing and patterning a metal layer overlaying said passivation and said piezoresistive layers on the front side of said semiconductor substrate to carry out signals;

(i) partially etching said passivation, dielectric and diffusion layers to define microbridge structure on a mesa; and (j) partially etching said semiconductor substrate to define suspended heater structure of said microvalve region, suspended sensing structure of said mass flow sensing region, and at least one supporting bump.

2. The method of claim 1, wherein said piezoresistive layer is polysilicon with a thickness of about 0.2 to 0.4 μm.

3. The method of claim 2, further comprising a step of annealing prior to step (f).

4. The method of claim 1, wherein said dielectric layer is a material selected from the group consisting of oxide, nitride and polyimide.

5. The method of claim 1, wherein said passivation layer is a material selected from the group consisting of oxide, nitride and oxynitride.

6. The method of claim 1, wherein said metal layer is a material selected from the group consisting of platinum-chromium (Pt/Cr), aluminum, silver and gold.

7. The method of claim 1, wherein said etching in step (j) is performed by a solution selected from the group consisting of hydroxide (KOH), ethylenediamine pyrocatechol (EDP) and tetra-methyl amino-hydroxide (TMAH).

8. The method of claim 7, wherein said etching in step (j) is performed at a temperature ranging from 50° C. to 70° C.

9. A method of fabricating an integrated MFC module on a semiconductor substrate with front and back sides, wherein said MFC module comprises microvalve and mass flow sensing regions, comprising the steps of:

(a) growing an oxide layer on the surface of both front and back sides of said semiconductor substrate;

(b) partially etching said oxide layer on the front side of semiconductor substrate to define said microvalve and mass flow sensing regions;

(c) forming a diffusion layer on the front side surface of semiconductor substrate, wherein said diffusion layer is served for microvalve of said microvalve region and microbridge of said mass flow sensing region;

(d) removing the remaining of said oxide layer, and then forming a dielectric layer on the surface of both front and back sides of said semiconductor substrate;

(e) sequentially forming a barrier layer and a thermoresistive layer overlaying said dielectric layer on both front and back sides of said semiconductor substrate, wherein said thermoresistive layer is served for heater of said microvalve region and sensing element of said mass flow sensing region;

(f) partially etching said barrier layer and thermoresistive layer to define heater area of said microvalve region and said microbridge of said mass flow sensing region;

(g) depositing a passivation layer over the entire said semiconductor substrate, and then patterning said passivation layer to define mass flow channel of said microvalve region and sensing membrane of said mass flow sensing region;

(h) depositing and patterning a metal layer overlaying said passivation and said thermoresistive layers on the front side of said semiconductor substrate to carry out signals;

(i) partially etching said passivation, dielectric and diffusion layers to define microbridge structure on a mesa; and (j) partially etching said semiconductor substrate to define suspended heater structure of said microvalve region, suspended sensing structure of said mass flow sensing region, and at least one supporting bump.

10. The method of claim 9, wherein said barrier layer is a material selected from the group consisting of titanium (Ti) and chromium (Cr).

11. The method of claim 9, wherein said piezoresistive layer is platinum (Pt).

12. The method of claim 9, wherein said piezoresistive layer is polysilicon.

13. The method of claim 9, wherein said dielectric layer is a material selected from the group consisting of oxide, nitride and polyimide.

14. The method of claim 9, wherein said passivation layer is a material selected from the group consisting of oxide, nitride and oxynitride.

15. The method of claim 9, wherein said metal layer is a material selected from the group consisting of platinum-chromium (Pt/Cr), aluminum, silver and gold.

16. The method of claim 9, wherein said etching in step (j) is performed by a solution selected from the group consisting of hydroxide (KOH), ethylenediamine pyrocatechol (EDP) and tetra-methyl amino-hydroxide (TMAH).

17. The method of claim 16, wherein said etching in step (j) is performed at a temperature ranging from 50° C. to 70° C.

18. A method of fabricating an integrated MFC module, wherein said MFC module comprises top, middle and bottom parts, comprising the steps of:

forming top, middle and bottom parts separately, and then engaging said top, middle and bottom parts together, wherein said middle part comprises microvalve and mass flow sensing regions;

wherein said top part fabrication, comprising the steps of:

1a. forming a mask layer on the surface of a first substrate, and then defining mass entrance, signal output terminals and cavity patterns on said mask layer;

1b. etching said first substrate not covered by said mask layer, thereafter, removing said mask layer;

wherein said bottom part fabrication, comprising the steps of:

2a. forming a mask layer on the second surface of a substrate, and then defining mass exit, signal output terminals and cavity patterns on said mask layer;

2b. etching said second substrate not covered by said mask layer, thereafter, removing said mask layer.

19. The method of claim 18, wherein at least one of substrates said is a material selected from the group consisting of glass, and semiconductor wafer.

20. The method of claim 18, wherein said mask layer is gold/chrome alloy.

21. A method of fabricating an integrated MFC module, wherein said MFC module comprises top, middle and bottom parts, comprising the steps of:

forming top, middle and bottom parts separately, and then engaging said top, middle and bottom parts together, wherein said middle part comprises microvalve and mass flow sensing regions;

wherein said top part fabrication, comprising the steps of:

1a. forming a mask layer on the surface of a first substrate, and then defining signal output terminals and cavity patterns on said mask layer;

1b. etching said first substrate not covered by said mask layer, thereafter, removing said mask layer;

wherein said bottom part fabrication, comprising the steps of:

2a. forming a mask layer on the surface of a second substrate, and then defining mass entrance, mass exit, signal output terminals and cavity patterns on said mask layer;

2b. etching said second substrate not covered by said mask layer, thereafter, removing said mask layer.

22. The method of claim 21, wherein at least one of substrates said is a material selected from the group consisting of glass, and semiconductor wafer.

23. The method of claim 21, wherein said mask layer is gold/chrome alloy.

* * * * *